United States Patent [19]
Morimoto

[11] Patent Number: 5,368,331
[45] Date of Patent: Nov. 29, 1994

[54] SAFETY STEERING WHEEL DEVICE FOR A MOTOR CAR

[76] Inventor: Kazunaga Morimoto, 30-9, Bessho-cho, Omiya-shi, Saitama-ken, Japan

[21] Appl. No.: 90,696

[22] Filed: Jun. 22, 1993

[30] Foreign Application Priority Data

Jul. 14, 1992 [JP] Japan .................................. 4-227712

[51] Int. Cl.⁵ .................................................. B62D 1/11
[52] U.S. Cl. ......................................... 280/777; 180/78
[58] Field of Search ................... 280/777; 180/78, 79, 180/79.3

[56] References Cited
U.S. PATENT DOCUMENTS

| | | | |
|---|---|---|---|
| 3,820,615 | 6/1974 | Bobard | 180/79 |
| 3,945,662 | 3/1976 | Murase et al. | 280/777 |
| 5,141,248 | 9/1992 | Haldric et al. | 280/777 |

FOREIGN PATENT DOCUMENTS

| | | | |
|---|---|---|---|
| 1134299 | 8/1962 | Germany | 280/777 |
| 1219758 | 1/1971 | United Kingdom | 180/78 |

Primary Examiner—Margaret A. Focarino
Assistant Examiner—Christopher P. Ellis

[57] ABSTRACT

A safety steering wheel device for a motor car which prevents a driver from being injured when in a car crash accident comprises a steering wheel 1 formed into a given shape, flexible tubes 2 supporting the wheel 1 so that it can move laterally and back and forth, a detector 4 for detecting an amount of a lateral displacement of the wheel 1, and a steering means 5 coupled to the detecting means 4. In a normal driving operation, car wheels 6 are turned to the right or left by moving the steering wheel 1 to the right or left in the lateral direction. In the car crash accident, the flexible tube 2 is flexibly deformed, thereby absorbing a shock from the car crash.

3 Claims, 3 Drawing Sheets 5,368,331

1

SAFETY STEERING WHEEL DEVICE FOR A MOTOR CAR

BACKGROUND OF THE INVENTION

1. Field of the Invention

This invention relates to a safety steering wheel device for a motor car and particularly to a safety steering wheel device for a motor car, which can move back and forth so as to protect a driver when a car crash accident happens during a drive running.

2. Statement of the Prior Art

A conventional steering wheel for a motor car is of a circular form and is secured to a steering column. Since the steering column is rigid, the steering wheel is permitted to merely rotate about the column. However, in this construction, the driver might collide strongly against against the wheel when the car crash accident happens. Then, the driver may be wounded at his chest or might lose his life.

Recently, some of the automobiles of a high class have a collapsible steering wheel. The collapsible steering wheel, however, is still of a large circular form and the steering column for supporting the wheel remains rigid. Accordingly, the problem of the above injury in the car crash accident is not completely resolved.

SUMMARY OF THE INVENTION

An object of the present invention is to provide a safety steering wheel device for a motor car, which prevents a driver from injury when the car crash accident happens during a drive on running.

In order to achieve the above object, a safety steering wheel device for a motor car in accordance with the present invention comprises a steering wheel formed into a given shape, flexible tubes for supporting the steering wheel so that it can move laterally and back and forth, a means for detecting an amount of a lateral displacement of the steering wheel, and a steering means coupled to the detecting means.

The detecting means preferably includes a rack, a pinion and a gear box while the steering means preferably includes a steering gear.

The detecting means may include an actuating rod and a power switch while the steering means may include a power cylinder.

In the safety steering car device for the motor car, during a normal driving operation, an amount of lateral displacement of the steering wheel is transmitted through the flexible tube to the detecting means, which is activated in accordance with the detected amount so that the car wheels are directed to any direction by the driver. In an abnormal driving operation such as in a car crash accident or the like, the flexible tube is flexibly deformed back and forth in the lateral direction when the driver strongly pushes the steering wheel with his hands or a part of his body, whereby the driver will not be injured.

2

Figure 5:
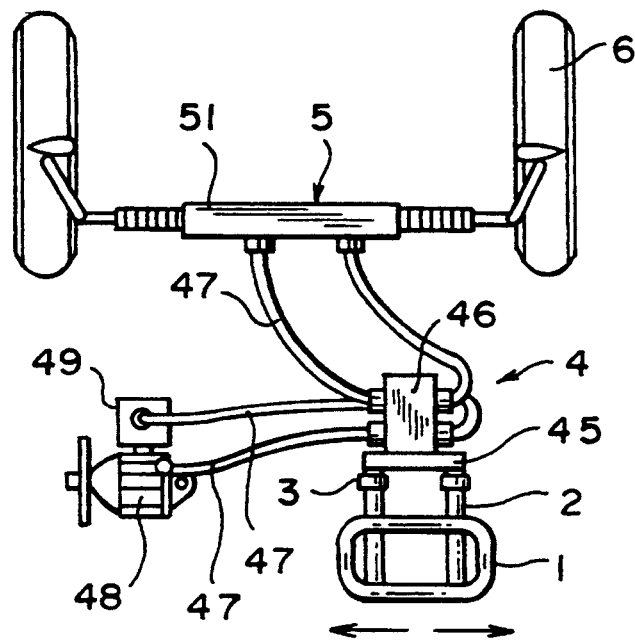
Figure 6:
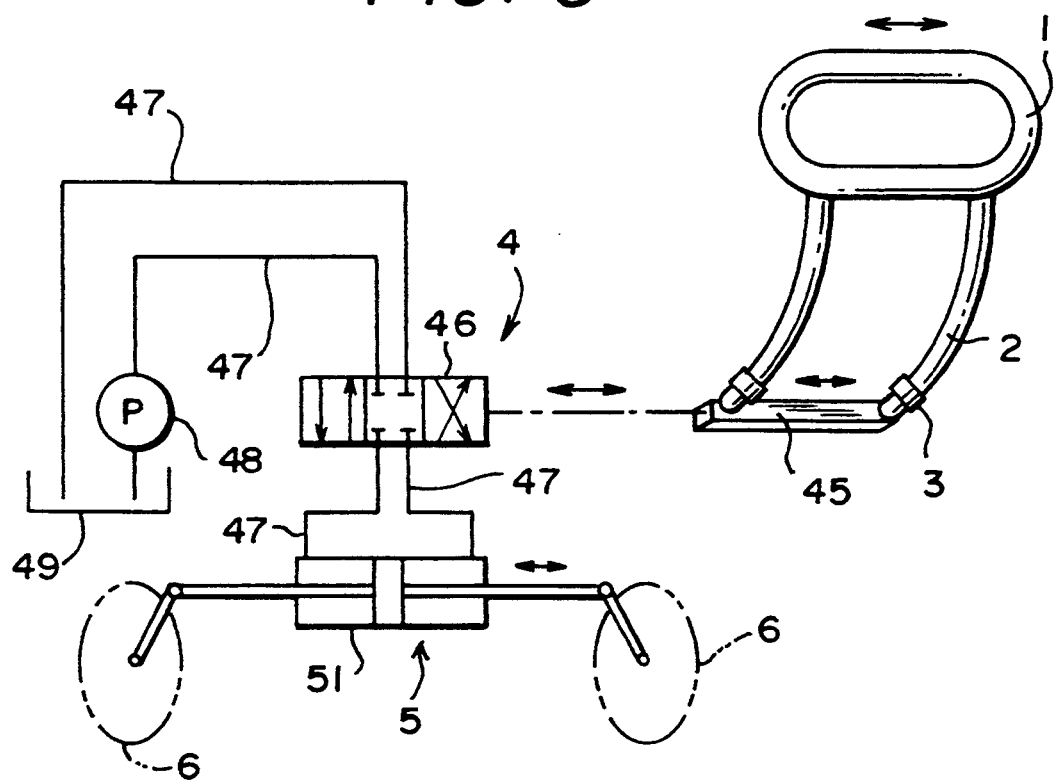

FIG. 5 is a plan view of an alteration of the safety steering wheel device for the motor car in accordance with the present invention; and FIG. 6 is an explanatory view illustrating an example of a hydraulic circuit in FIG. 5.

DETAILED DESCRIPTION OF THE PREFERRED EMBODIMENTS

Referring now to FIGS. 1 to 4, a first embodiment of a safety steering wheel device for a motor car in accordance with the present invention will be explained below.

Figure 1:
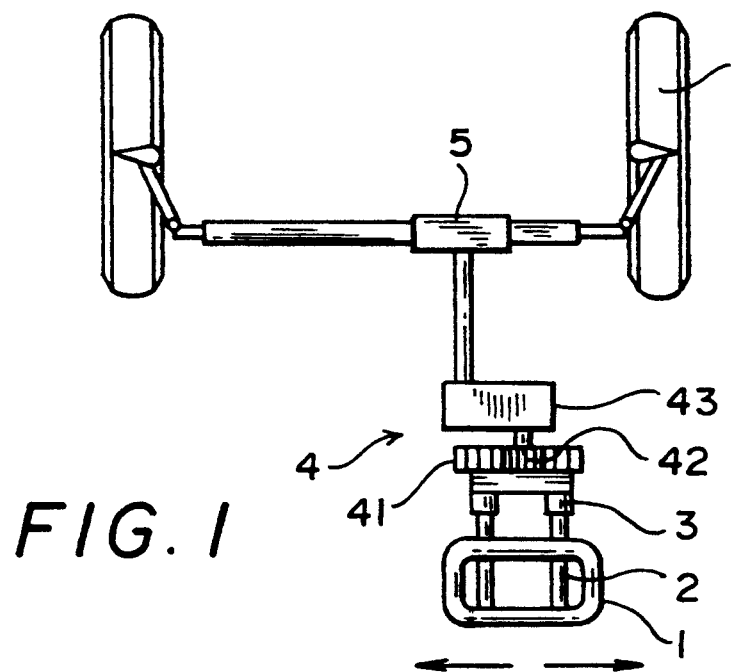
FIG. 1 is a plan view of a safety steering device for a motor car in accordance with the present invention.
Figure 2:
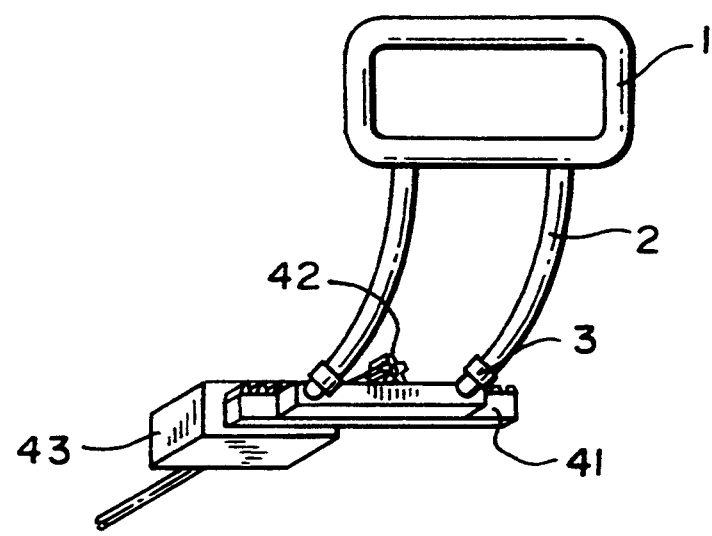
FIG. 2 is a perspective view of a safety steering wheel of the present invention.
Figure 3:
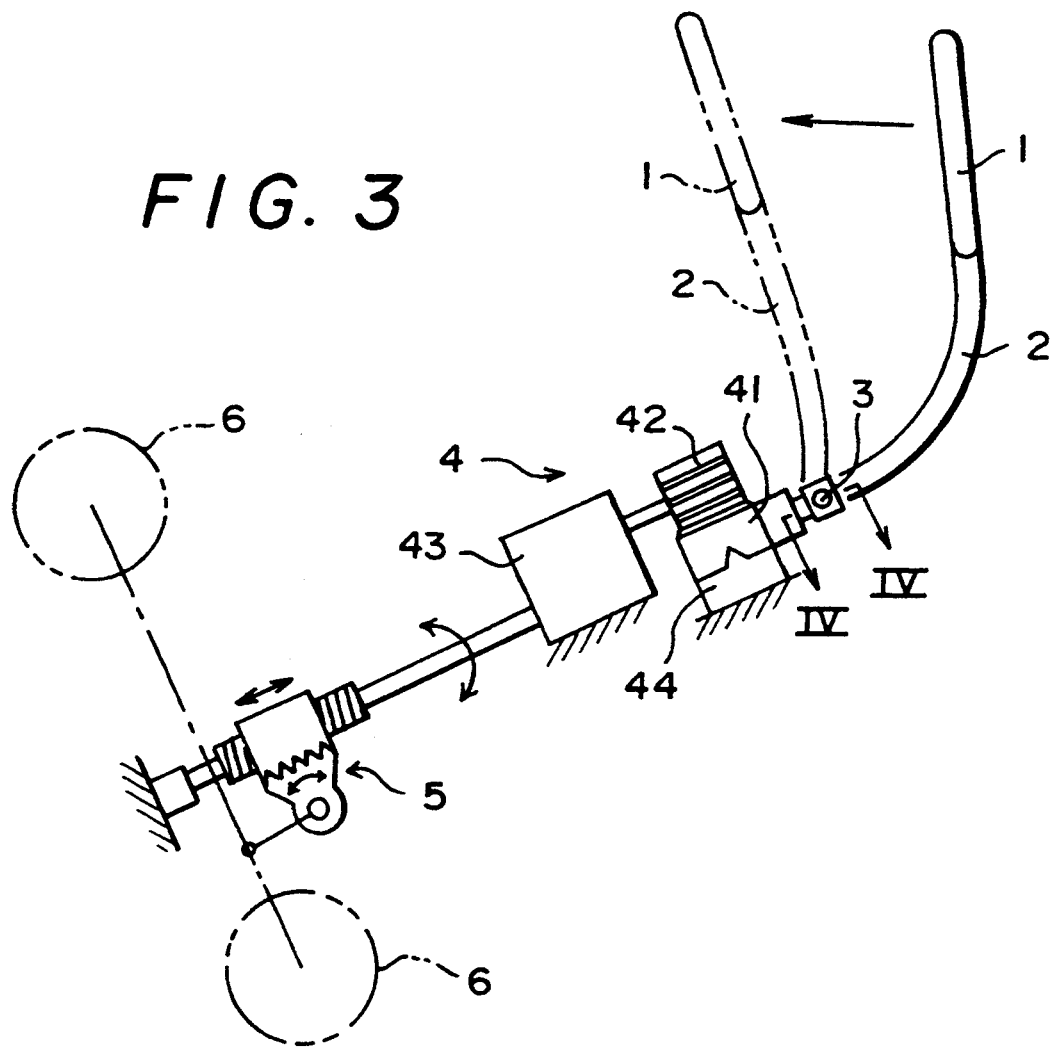
FIG. 3 is a side view of FIG. 1.
Figure 4:
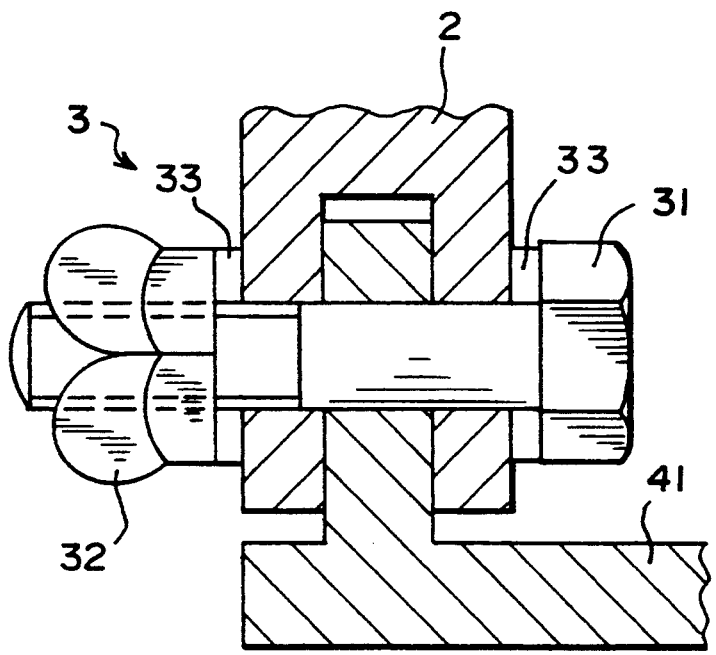
FIG. 4 is a partial cross sectional view taken along lines IV—IV in FIG. 3.

FIG. 1 is a plan view of the device of the present invention, FIG. 2 is a perspective view of a safety steering wheel, FIG. 3 is a side view of FIG. 2, and FIG. 4 is a partial cross sectional view taken along lines IV—IV in FIG. 3.

As shown in FIG. 1, a safety steering wheel device for a motor car in accordance with the present invention comprises a steering wheel 1 formed into a given shape, flexible tubes 2 supporting the wheel 1 so that the wheel 1 can move laterally and back and forth, a mechanism 4 for detecting an amount of lateral displacement of the wheel 1, and steering mechanism 5 coupled to the detecting mechanism 4.

In the first embodiment, the detecting mechanism 4 includes a rack 41, a pinion 42, and a gear box 43 while the steering mechanism 5 has a steering gear. One end of each flexible tubes 2 is rotatably coupled to the rack 41 through an adjusting connector 3. The pinion 42 coupled to the gear box 43 engages with the rack 41.

As shown in FIG. 3, the rack 41 is prevented from moving back and forth on a support table 44 but can move horizontally on the table 44.

Although the adjusting connector 3 may be of a conventional mechanism, it may be an adjustable fastening mechanism including, for example, a bolt 31, a butterfly nut 32, and a spring washer 33 as shown in FIG. 4.

The steering wheel 1 can be set in an optimum position prior to driving by adjusting the connector 3 in accordance with a driver's physical features.

As shown in FIG. 1, in a normal driving operation, when a driver displaces the wheel in a lateral direction shown by arrows, the rack 41 is displaced laterally while rotating the pinion 42. The revolution of the pinion 42 is decreased or increased by the gear box 43 and transmitted to the steering gear 5. consequently, car wheels 6 are moved to the right or left.

In this case, it will be preferable to set the steering gear 5 so that the motor car is turned, for example, to the right when the steering wheel 1 is turned, for example, to the right.

A second embodiment of the safety steering wheel device of the motor car in accordance with the present invention will be explained below by referring to FIGS. 5 to 6.

FIG. 5 is a plan view of the device of the present invention and FIG. 6 is an explanatory view of an example of a hydraulic circuit.

As the basic construction of the second embodiment is the same as that of the first embodiment, the description thereof is omitted and only differences therefrom are explained.

In the second embodiment, the detecting mechanism 4 includes an actuating rod 45 and a power switch 46 while the steering mechanism 5 has a power cylinder 51.

As shown in FIGS. 5 and 6, the power switch 46 is coupled to a hydraulic pump 48 through a hydraulic pipe 47 and to a power cylinder 51 through another hydraulic pipe 47. The actuating rod 45 is connected to the power switch 46. The power switch 46 is coupled through still another hydraulic pipe 47 to anoil reservoir 49.

As shown in FIG. 5, in a normal driving operation, when the driver displaces the steering wheel 1 in a lateral direction shown by arrows, the actuating rod 45 is displaced laterally and thus the power switch 46 is changed over. The power switch 46 passes a pressurized oil to the cylinder 51, thereby turning the car wheels 6 to the right or left.

In an abnormal driving operation such as a car crash or the like, the steering wheel 1 is pushed and displaced forwardly by driver's hands or a part of his body in the first embodiment (FIG. 3) and the second embodiment (FIG. 6). At this time, the flexible tubes 2 are flexibly deformed back and forth, thereby absorbing a shock of collision.

In the present invention, the steering wheel may be formed into a square, circular, oval, or polygonal shape as well as a rectangular shape shown in the drawings.

According to the present invention, it is possible to adjust the position of the steering wheel by adjusting the connector and flexible tubes in accordance with the driver's body and since the steering wheel can be lightly and smoothly displaced to the right and left, the driving performance can be improved. In addition, since the flexible tubes are flexibly deformed in the car crash accident to absorb the shock of collision, the steering wheel does not injure the driver and ensures the lift of the driver against the crash.

What is claimed is:

1. A safety steering wheel device for an automobile, comprising:

a steering wheel;

support means for said steering wheel comprising laterally opposed flexible tubes attached to and supporting said steering wheel, said flexible tubes permitting movement of said steering wheel in a lateral direction as well as both in a rearwardly and in a forwardly direction;

means for detecting the amount of lateral displacement of said steering wheel; and means to turn wheels of said automobile in response to the detected lateral displacement of said steering wheel.

2. The safety steering wheel device of claim 1 wherein said means for detecting said lateral displacement includes a rack, a pinion, and a gear box, and wherein said means to turn wheels includes a steering box.

3. The safety steering wheel device of claim 1 wherein said means for detecting said lateral displacement includes an actuating rod and a power switch, and wherein said means to turn wheels includes a power cylinder.

* * * * *